Dec. 4, 1934.   A. O. AUSTIN   1,983,336
POTHEAD
Filed Nov. 26, 1932
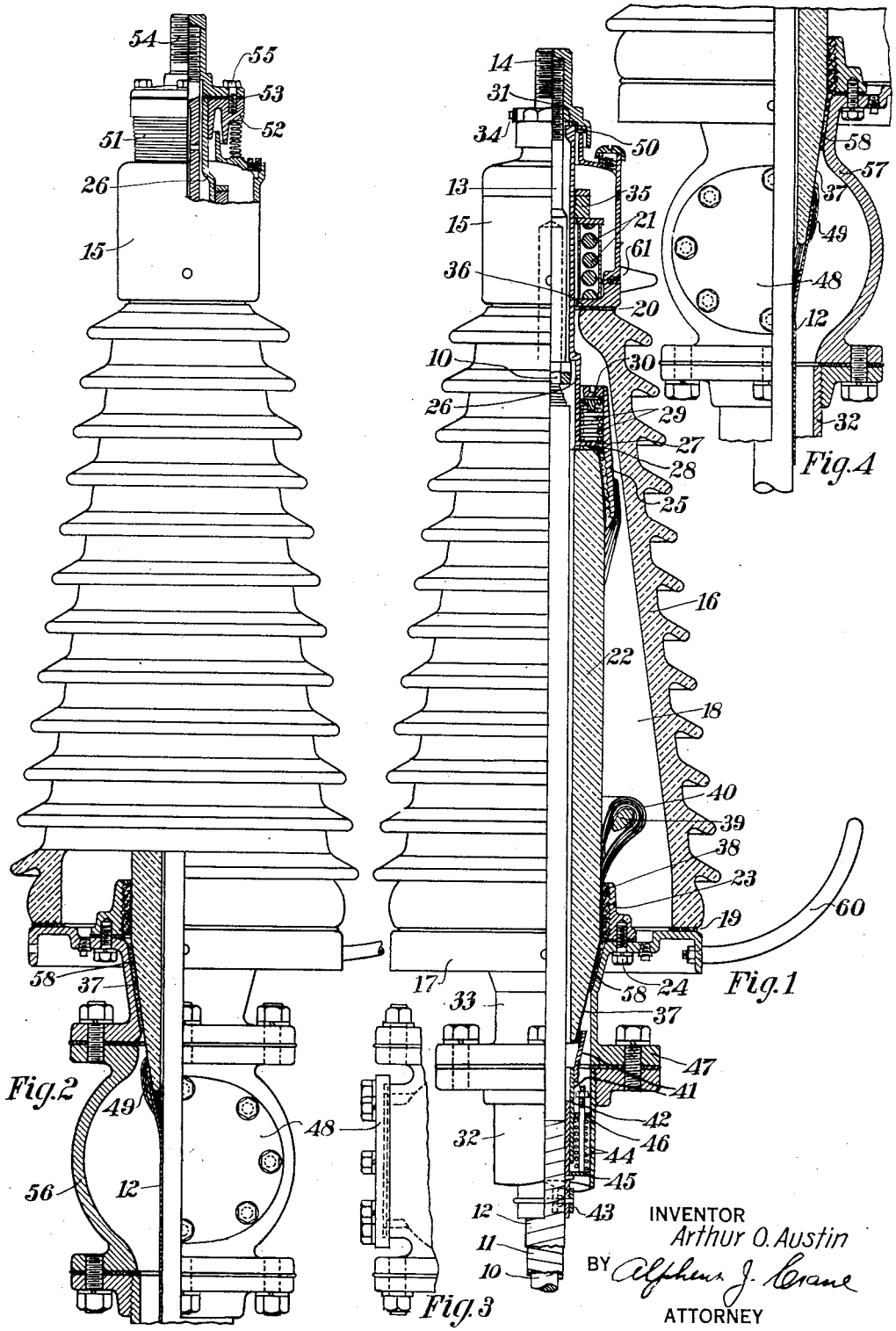
INVENTOR
Arthur O. Austin
BY
ATTORNEY Patented Dec. 4, 1934

1,983,336

UNITED STATES PATENT OFFICE 1,983,336

POTHEAD

Arthur O. Austin, near Barberton, Ohio, assignor, by mesne assignments, to The Ohio Brass Company, Mansfield, Ohio, a corporation of Ohio Application November 26, 1932, Serial No. 644,414

9 Claims. (Cl. 247—6)

This invention relates to terminals for electric cables and has for one of its objects the provision of a cable terminal or pothead which can be easily assembled and which will prevent concentration of electrostatic stress on the cable insulation at the termination of the cable sheath.

A further object of the invention is to provide a cable terminal or pothead which will effectively insulate the live cable from ground but will permit maintenance of a comparatively high pressure in the insulating material surrounding the cable.

Other objects and advantages will appear from the following description.

The invention is exemplified by the combination and arrangement of parts shown in the accompanying drawing and described in the following specification, and it is more particularly pointed out in the appended claims.

In the drawing:

Fig. 1 is an elevation with parts in section showing one embodiment of the present invention.

Fig. 2 is a view similar to Fig. 1 showing a slight modification of the invention.

Fig. 3 is a fragmentary elevation of a portion of the device shown in Fig. 2 at right angles to Fig. 2.

Fig. 4 is an elevation with parts in section showing a modified form of base member for the pothead.

In terminating high voltage cables, particularly those operated under oil or air pressure, it is necessary to provide an insulating terminal which will not only withstand voltage but which will withstand pressure as well. It is also very important to provide a terminal or pothead for connection between an overhead line and the cable system which can be readily installed. In my improved type of pothead, provision is made for these advantages.

In the form of the invention shown in Fig. 1, a high potential cable 10 is provided with an insulating covering 11 and an outer metal sheath 12 which may be in the form of a wrapping of very thin sheet copper. The upper end of the cable 10 is secured to a terminal member 13, threaded into a cap 14 which closes the upper end of an expansion chamber 15. An insulating shell or weather shed 16 provides the necessary insulation between the live expansion chamber 15 and a grounded base 17 which supports the pothead. The space 18 within the shell 16 is filled with oil or other suitable insulating medium. Gaskets 19 and 20 are placed between the shell 16 and the base plate 19 and expansion chamber 15 respectively to form tight joints at these points. A spring 21 is used to provide pressure on the gaskets 19 and 20. A central insulating member 22 has a flange 23 cemented thereto and bolted to the base plate by cap screws 24. The upper end of the insulating member 23 is provided with a flange 25 cemented thereto. A sleeve 26 has a flange 27 bearing on a gasket 28 placed between the flange and the upper end of the insulating member 22. Pressure is exerted on the gasket 28 by means of the springs 29, which bear against ring flange 30 threaded into sleeve 25. These springs 29 exert pressure on the gasket 28 to maintain a tight joint between the sleeve 26 and the member 22. This prevents any leakage of oil or filling fluid from the space around the cable 10 into the space between the central insulator 22 and the shell 16.

The terminal cap 14 forms a tight joint with the tube 26 by means of a gasket 31. When the weather cap is screwed down, it will not only hold the cable 10 with its terminal 13 in position but will seal off the space adjacent to the cable so that pressure may be carried around the cable. The cable is surrounded by a housing or conduit 32 which is bolted to a sleeve 33 formed on the base 17, and the space in the conduit surrounding the cable is filled with oil or other insulating liquid under pressure that may range from one hundred eighty to two hundred fifty pounds per square inch. This pressure extends up inside the insulator 22 about the cable 10.

In order to provide venting of the space about the cable inside the sleeve 26, the terminal cap 14 is provided with a removable plug or other suitable venting means 34. This connects into the space between the terminal 13 and the member 26, so that the space between the cable 10 and the member 22 may be vented by opening the vent 34.

A nut 35 is screwed onto the member 26 and exerts pressure on the spring 21, which in turn will exert pressure upon the gasket 20 by means of a flange 36 on the expansion chamber 15. This pressure must be sufficient to maintain a tight seal on the gasket 20 and on the gasket 19. The spring provides resiliency so that any differential expansion between the inner and outer members will not loosen the gaskets, preventing discharge of oil or the filling medium used in the space 18.

In this combination the combined springs 29 must be stiffer than the spring 21 so that the reaction produced by the spring 21 will not remove the pressure on the gasket 28 to such an extent that it will not hold the pressure between the cable and the member 22.

The member 22 is provided with a tapered portion 37 commonly used in picking up the electrostatic stress in pothead construction. The outer surface of the conical portion 37 is metallized or covered with conducting tape or braid common in this type of construction. This conducting covering extends up through the joint 38 and is connected with the electrostatic screen 39 covered with insulating material 40. The conducting covering 37 preferably is bonded to the flange 23.

In order to facilitate installation, a conical sleeve 41 is arranged so that it will make contact with the conducting surface or tape 37. The conical member 41 is free to move with respect to a stationary member 42, clamped to the cable by means of a clamp 43. This insures contact with the metallic tape 12 covering the cable; the metallic tape being terminated inside the stationary member 42 and in contact with same. The springs 44 are placed between a flange 45 on the stationary member 42 and a flange 46 on the movable member 41. This tends to hold the member 41 in contact with the conducting cover 37.

It is seen that this arrangement provides some latitude in assembly and any slight difference in expansion or contraction will be taken up by these members without affecting the contact or the electrical field where the cable enters the lower portion of the member 22. With this arrangement, it is possible to grade the electrostatic stress by means of the tapered conducting surface 37 without producing a high concentration of electrostatic stress that might cause breakdown of the insulation on the cable. The pothead forms a means of transferring the electrostatic stress from the insulation on the cable to the insulation provided by the pothead.

With this arrangement, it is evident to those familiar with the art that the cable with its terminal member 13 may be drawn up through the center of the pothead while the latter is lowered into place. The movable sleeve 41 will make contact with the conducting surface or tape 37 as the pothead comes into proper position with respect to the cable. The member 33 is provided with a flange 47 which is used to make a tight joint with the conduit or pipe 32 which encloses the cable and carries the pressure about the cable.

In Fig. 1 the conducting sheath 12 over the cable is joined automatically to the conducting surface 37 during the installation; it being unnecessary to provide space for taping these parts together.

In Figs. 2 and 3 space is provided so that conducting tape can be applied to these parts through a window or port which is covered by a plate 48. The general construction in Figs. 2 and 4 is the same as that in Fig. 1 with the exception that the sliding sleeve 41 connecting the metallic tape on the cable to the conducting surface of the insulating member of the pothead is replaced in Figs. 2 and 4 by a conducting tape 49.

In Fig. 1 the expansion chamber 15 may be sealed with a gasket 50 while in Fig. 2 this seal is provided by a sheet metal bellows 51 which is soldered or brazed to the expansion chamber 15 and to a terminal plate 52. This terminal plate 52 forms a tight joint with the member 26. A gasket 53 is placed between the terminal cap 54 and the terminal plate 52. The cap screws 55 make it possible to form a tight joint with the gasket 53 without the necessity of the terminal cap moving over the gasket, as in the case of Fig. 1.

In Fig. 2 the member 56 with its window covered by plate 48 is made up as a separate member. In Fig. 4 a corresponding member 57 is a part of the base casting of the pothead.

In the various forms of construction, a tight seal is formed by means of a gasket 58 between the tapered portion of insulating member 22 and its seat on the base support. The insulating member 22 is also used as a tension member to provide the necessary pressure for forming tight joints between the insulating shell 16 and the expansion chamber 21 and base plate 17. With the construction shown a pothead is made up complete and all that is necessary for installation is to drop the pothead over the cable which has been provided with a suitable terminal, or the cable may be drawn up through the pothead after which the terminal cap can be screwed into place. Discharge horns 60 and 61 may be provided for limiting the voltage, due to surges or other causes impressed upon the pothead.

I claim:

1. In combination a dielectric shell member, abutments engaging opposite ends of said shell member respectively, a tubular insulator extending through said shell member, one end of said insulator being secured to one of said abutments, and means including a spring, connecting the other end of said insulator with the other abutment and exerting tension on said insulator and pressing said abutments against said shell member.

2. A pothead comprising a dielectric shell member, fittings engaging opposite ends of said shell member respectively, a tubular insulator having one end secured to one of said fittings, means, including a spring, connecting said tubular insulator with the other fitting and exerting tension on said insulator to press said fittings against said shell member, and a conductor extending through said insulator.

3. A pothead comprising a base, a dielectric shell member having one end thereof resting on said base, a closure member engaging the other end of said shell member, a tubular insulator extending through said shell member and having one end thereof fixed to said base and having liquid tight connection therewith, means for sealing the other end of said tubular insulator, a conductor extending through said tubular insulator, a conduit surrounding said conductor outside of said insulator and communicating with the interior of said insulator, and means, including a spring, connecting said insulator with said closure member and exerting tension on said insulator to press said closure member against said shell member and said shell member against said base.

4. The combination with a cable comprising a conductor, insulation surrounding said conductor, a conducting covering disposed about said insulation, a conduit surrounding said conducting covering and insulating fluid under pressure within said conduit, of a terminal for said cable comprising a housing having an opening through the wall thereof for receiving said cable, a tubular insulator having a tapered end portion disposed adjacent said opening, conducting covering on the surface of said tapered end portion, means for securing said conduit to the wall of said housing about said opening, a contact member electrically connected with the conducting covering about the insulation on said cable, said contact member being movable relative to said cable, and spring means for pressing said contact member into electrical engagement with the conducting covering on the tapered end portion of said insulator when said cable is drawn into the opening in said tubular insulator and said conduit is secured to the wall of said housing.

5. A pothead comprising a base member having an opening therethrough, a tubular insulator having one end thereof fixed to said base member adjacent said opening, a conductor extending through said tubular insulator, an insulating housing surrounding said tubular insulator, and spring pressed means secured to said tubular insulator and bearing on said housing for resiliently pressing said housing against said base member.

6. A pothead comprising a base member having an opening therethrough, a dielectric housing member having one end thereof bearing on said base member, a tubular insulator having one end thereof tapered and extending into the opening in said base member, means for forming a liquid tight joint between the tapered end of said tubular insulator and said base member, a cable extending into said tubular insulator, a terminal member for said cable arranged to seal the upper end of said tubular insulator to exclude pressure within said insulator from the space in said housing about said insulator, and resilient means connected to said insulator for holding said housing in contact with said base member.

7. A pothead comprising a base plate having a tapered opening therethrough, a tubular insulator having a tapered end extending into the tapered opening through said base plate, means for forming a tight joint between said base plate and said insulator, a conduit having the end thereof secured to said base plate adjacent said opening, a cable disposed in said conduit and extending into said insulator, a terminal member for said cable, means for sealing the upper end of said insulator to exclude pressure within said conduit from the space about said insulator, a dielectric housing having the lower end thereof bearing on said base plate, means for engaging the upper end of said housing, a spring bearing on said engaging means for maintaining tight joints at the upper and lower ends of said housing, and an abutment member for said spring connected to said tubular insulator.

8. A pothead comprising a base plate having a tapered opening therethrough, a tubular insulator having a tapered end disposed in said tapered opening, means for forming a tight joint between said tubular insulator and said base plate at said opening, a conduit having the end thereof secured to said base plate about said opening, a conductor in said conduit, insulation surrounding said conductor, a conducting covering surrounding said insulation, conducting covering surrounding the tapered end of said insulator, means for electrically connecting the conducting covering on said insulation with the conducting covering on the tapered end of said insulator, a dielectric housing surrounding said tubular insulator, a bearing member engaging the upper end of said housing, resilient means for pressing said bearing member against said housing for holding said housing against said base plate, an abutment member for said resilient means, yielding means for securing said abutment member to said tubular insulator, and means for sealing the upper end of said tubular insulator to prevent escape of liquid from the interior of said tubular insulator to the space about said insulator.

9. A pothead for a conductor having an opening through the wall thereof, a tubular insulator having a tapered end extending through said opening and having a liquid tight joint with the wall of said pothead, means for securing a conduit having a cable therein to the wall of said pothead about said opening, said securing means having a chamber therein provided with a hand hole to permit manipulation of the cable within said chamber, and a removable covering for said hand hole.

ARTHUR O. AUSTIN.